United States Patent [19]

Ramisch

[11] Patent Number: 4,556,192
[45] Date of Patent: Dec. 3, 1985

[54] BUTTERFLY VALVE WITH SERVO-MOTOR

[75] Inventor: Jan Ramisch, Fislisbach, Switzerland

[73] Assignee: BBC Brown, Boveri & Company Limited, Baden, Switzerland

[21] Appl. No.: 647,633

[22] Filed: Sep. 6, 1984

[30] Foreign Application Priority Data

Sep. 30, 1983 [CH] Switzerland ............ 5321/83

[51] Int. Cl.⁴ .................................. F16K 31/12
[52] U.S. Cl. ........................... 251/58; 251/279; 251/305; 251/308
[58] Field of Search ............ 251/22, 14, 31, 62, 251/305, 308, 48, 58, 279; 137/487, 512

[56] References Cited

U.S. PATENT DOCUMENTS 4,054,156 10/1977 Benson ..................... 251/63.6 X
4,158,367 6/1979 Mailliet ..................... 251/333 X
4,261,546 4/1981 Cory et al. ................. 251/279 X Primary Examiner—Larry Jones
Attorney, Agent, or Firm—Oblon, Fisher, Spivak, McClelland & Maier

[57] ABSTRACT

Butterfly valve actuated by a servo-motor, opening taking place by means of hydraulic force and closing by means of spring force. The hydraulic force must overcome the torque due to the flow, and the force of the closing spring. The excess hydraulic force of the servo-motor (2) during the end phase of the opening procedure is stored (3) and released during the closing procedure, whereby the closing time (t) can be minimized.

8 Claims, 6 Drawing Figures

BUTTERFLY VALVE WITH SERVO-MOTOR

FIELD OF THE INVENTION

The present invention concerns a butterfly valve actuated by a servo-motor in which opening takes place by means of hydraulic force and closing takes place by means of spring force.

BACKGROUND OF THE INVENTION

Butterfly valves, such as are used, for example, in the low-pressure region of steam turbines, are actuated by a servo-motor, with opening taking place by means of hydraulic force and closing by means of spring force. An open central butterfly valve with symmetrical wings is free from torque. When the butterfly wings are in an oblique position, the flowing medium exerts a torque which always tends to close the butterfly. The closing spring has the task of setting the butterfly into motion from the neutral open position, i.e., of accelerating the mass of the butterfly wings and all the moving parts. If a short closing time is required, and if the mass moment of inertia of the butterfly system is large, the acceleration time can account for a substantial part of the total closing time. The hydraulic force must overcome the torque due to the flow and the force of the closing spring. If a stronger spring is selected in order to decrease the closing time, the hydraulic force and hence the servo-motor must be larger.

OBJECTS OF THE INVENTION

The invention is intended to provide assistance on this point. The invention has the object of minimising the closing time of the butterfly without having to enlarge the servo-motor.

SUMMARY OF THE INVENTION

The servo-motor is dimensioned to suit the maximum torque due to the flow, which torque occurs at an opening angle of the butterfly between 30' and 50'. Due to the kinematic relationships at the servo-motor, the hydraulic force also acts at the end position where the valve is open, where it is not in fact required. This excess hydraulic force is stored, in the end position with the butterfly open, so that it can then be used in the initial phase of the closing procedure in order to accelerate the mass of the butterfly. By this means, the acceleration phase is shortened and the closing time minimised, the closure shortening effect increasing with increasing mass moment of inertia. In the case of heavy butterflies, it can amount to one third of the total closing time.

In a preferred embodiment, the excess hydraulic servo-motor force is converted into mechanical energy. The mechanical energy is stored in a spring assembly whose location is opposite the drive side of the butterfly.

BRIEF DESCRIPTION OF THE DRAWINGS

An embodiment example of the invention is shown diagrammatically in the drawing in which.

DETAILED DESCRIPTION OF THE PRESENTLY PREFERRED EMBODIMENT

All the elements which are not necessary for direct understanding of the invention are omitted. The same elements are each provided with the same reference numbers in the various figures.

Figure 1:
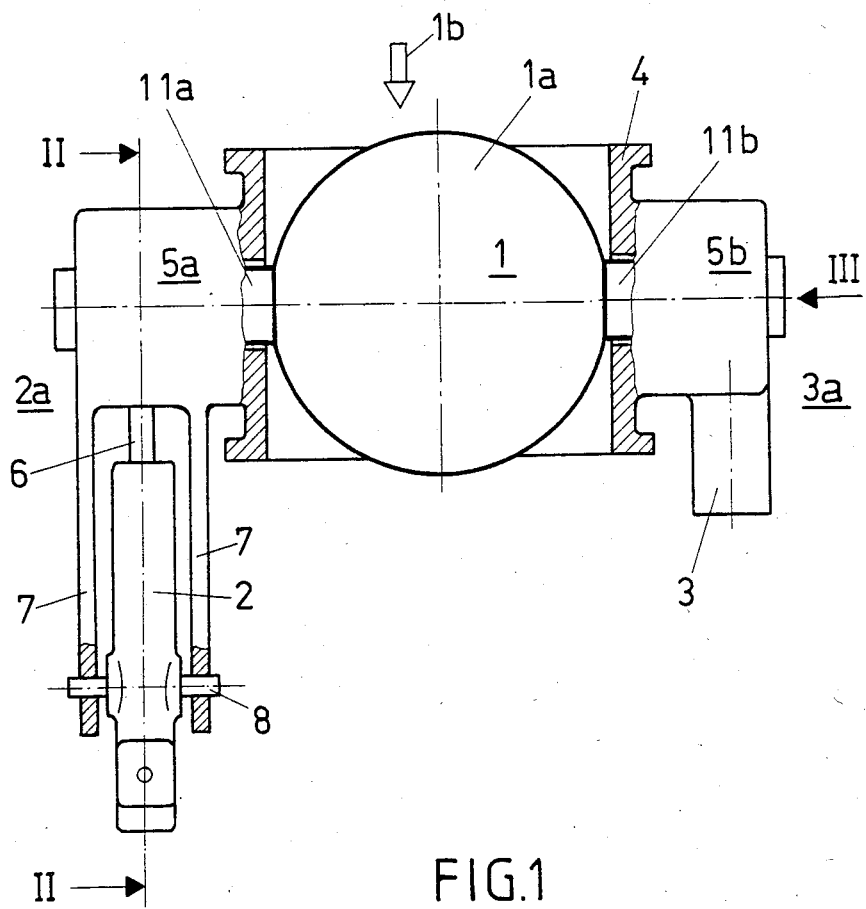
FIG. 1 shows a complete butterfly valve in the open position.

FIG. 1 shows the arrangement of a complete butterfly valve 1 in the open position. The shafts 11a and 11b attached to the butterfly wings 1a are supported in a butterfly valve casing 4. The two fork-shaped arms 7, which provide the anchoring 8 of the servo-motor 2, are solidly connected to the butterfly valve casing 4 at the drive-side butterfly bearing 5a. The partially visible piston rod 6 is connected to the shaft 11a. The spring accumulator side 3a, with the spring accumulator 3, is on the opposite side from the drive side 2a. The spring accumulator is similarly solidly connected to the butterfly valve casing 4 at the spring-accumulator-side butterfly bearing 5b.

Figure 2:
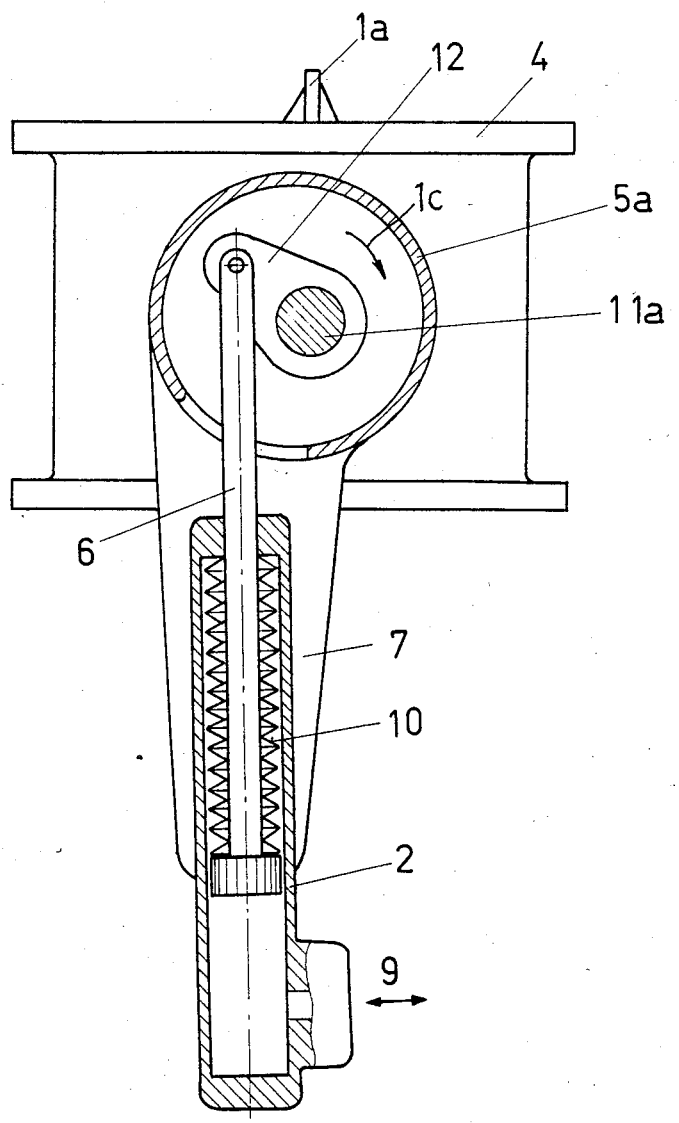
FIG. 2 shows the movement transmission between the servo-motor and the butterfly wings along the line II—II in FIG. 1.

As may be seen from FIG. 2, the transmission of movement between the butterfly wings drive-side shaft 11a and the piston rod 6 is provided by the crank 12. The hydraulic force 9 opens the butterfly wings 1a and simultaneously compresses the plate spring column 10, which is then responsible for the closing procedure.

Figure 3:
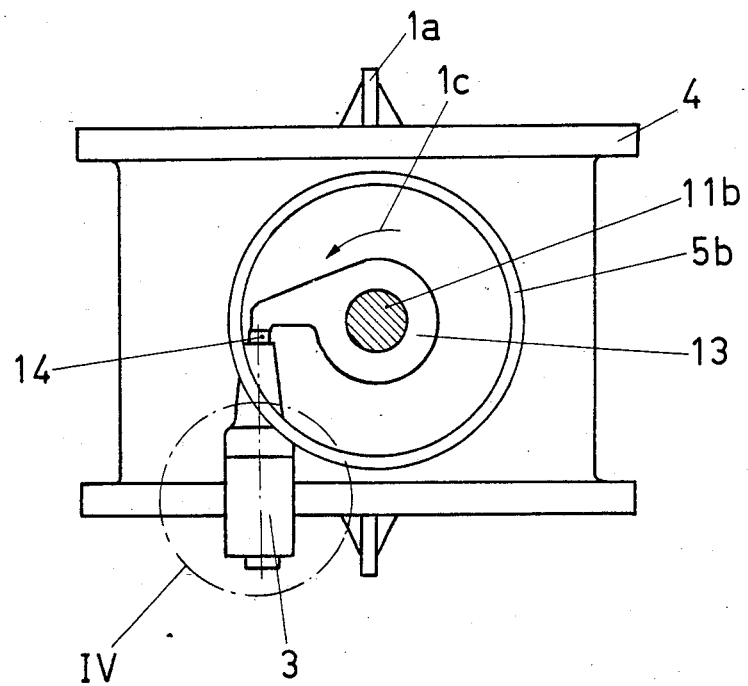
FIG. 3 shows the location of the spring accumulator viewed in the direction III in FIG. 1.

FIG. 3 shows the location of the spring accumulator 3 on the spring-accumulator-side butterfly bearing 5b. The cam disc 13, which presses on the spring accumulator 3 in the open position of the butterfly wings 1a, is solidly connected to the spring-accumulator-side shaft 11b of the butterfly wings 1a.

Figure 4:
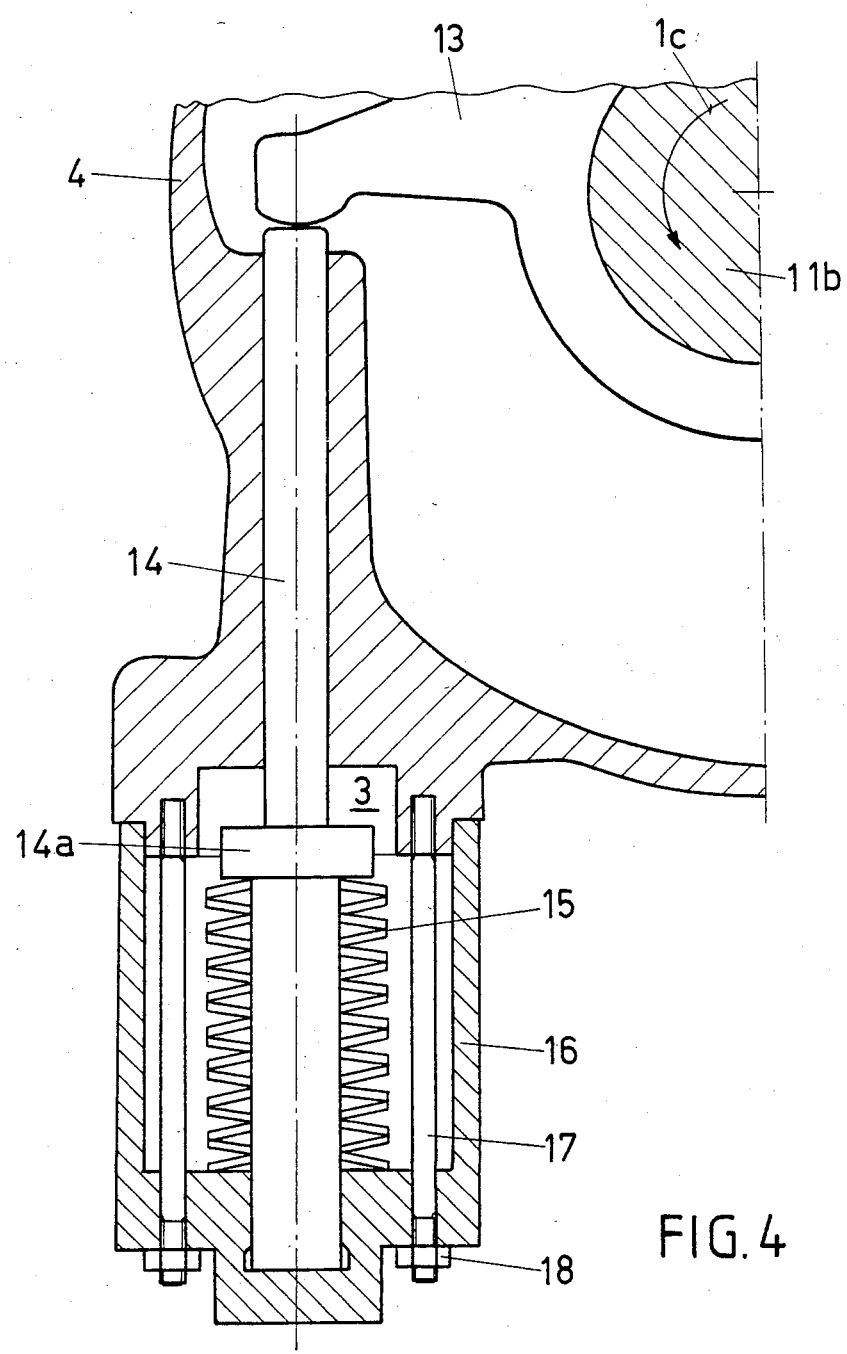
FIG. 4 shows the construction of a spring accumulator.

FIG. 4 shows the construction of the spring accumulator 3. It is solidly connected to the butterfly valve casing 4 by means of screws 17 and nuts 18. The plate spring column 15, whose force is generally several times greater than that of the spring 10 of the servo-motor 2, is installed between the collar 14a of the rod 14 and the bottom of the spring accumulator cap 16. In the end phase of the opening procedure of the butterfly wings 1a, the cam disc 13 solidly connected to the shaft 11b presses, in the direction of rotation 1c, on the rod 14 of the spring accumulator 3. By this means, the collar 14a compresses the plate spring column 15. The spring force of the compressed plate spring column 15 is then available, in addition to the already compressed plate spring column 10 of the servo-motor 2, during the closing procedure.

Figure 5:
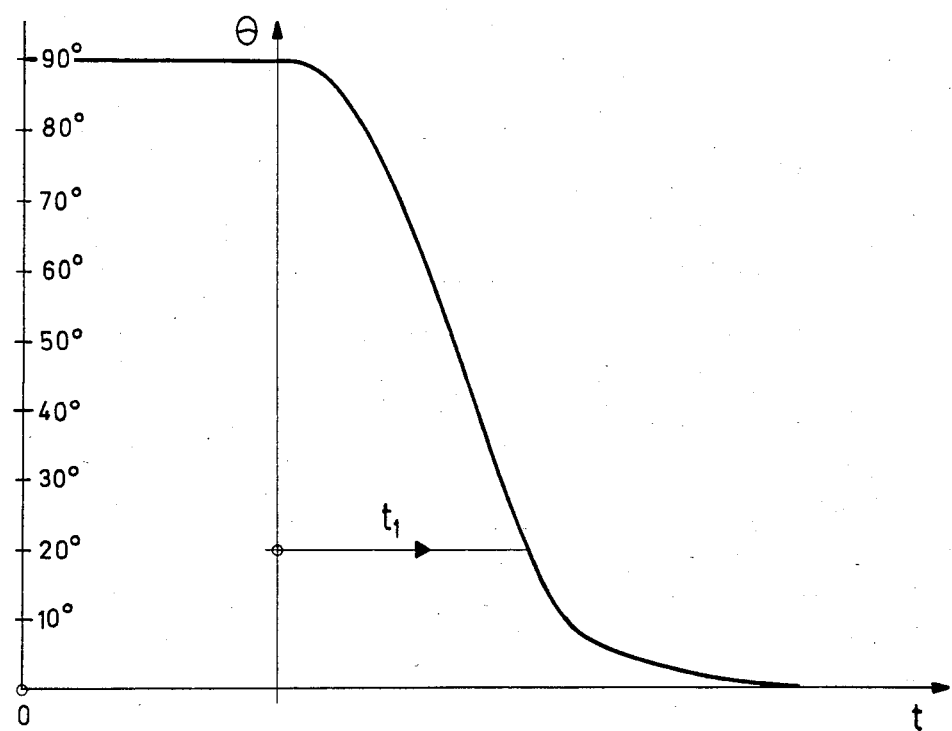
FIG. 5 shows the closing procedure of a butterfly valve without spring accumulator, plotted against time.
Figure 6:
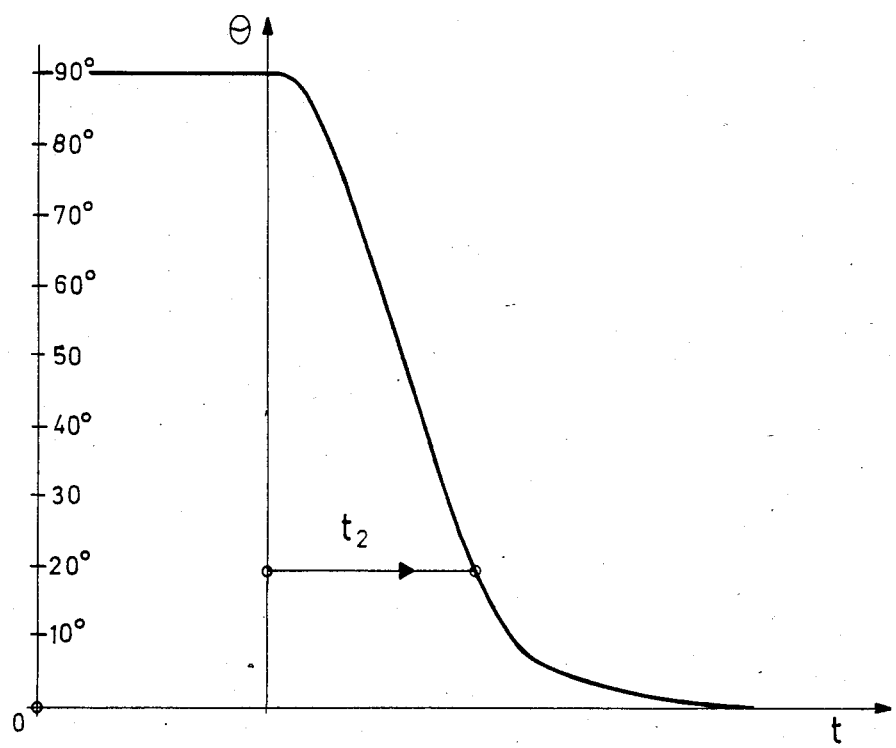
FIG. 6 shows the closing procedure of a butterfly valve with spring accumulator, plotted against time.

FIG. 5 and FIG. 6 show a comparison between rapid closure without energy accumulator (FIG. 5) and with energy accumulator (FIG. 6). As may be seen, the gain in closing time, $t_1-t_2$, between the completely open position (90°) of the butterfly wings 1a and the position with the valve closed down to 20°, for a moderately heavy butterfly valve 1 with a spring accumulator 3, is up to 17% of the closing time of a similar butterfly valve without a spring accumulator. In the case of heavy butterfly valves, the gain in closing time amounts to as much as 33%.

I claim:

1. A butterfly valve assembly comprising:
   (a) a valve casing containing a passageway for a fluid;
   (b) a butterfly valve disposed in said passageway and mounted on a shaft which is pivotably mounted in said valve casing, said butterfly valve being pivotably movable between a first position in which it blocks or minimizes the flow of fluid through said passageway and a second, fully opened position in which it maximizes the flow of fluid through said passageway;
   (c) a first spring continuously operatively connected to said shaft such that it continuously biases said butterfly valve towards its first position and such that it stores mechanical energy as said butterfly valve is pivoted towards its second position; and
   (d) a second spring intermittently operatively connected to said shaft such that it intermittently biases said butterfly valve towards its first position when said butterfly valve is near its second position and such that it stores mechanical energy as said butterfly valve is pivoted towards its second position;
   (e) wherein said second spring is located on an opposite side of the butterfly valve from said first spring and wherein a cam is mounted on said shaft, said cam compressing said second spring as the butterfly valve moves toward its second position.

2. A butterfly valve assembly as recited in claim 1 wherein said first spring is connected to said shaft through a crank arm the mechanical advantage of which is lower when said butterfly valve is in its second position than when said butterfly valve is in its first position.

3. A butterfly valve assembly as recited in claim 2 wherein said second spring stores mechanical energy when contacted by said cam mounted on said shaft.

4. A butterfly valve assembly as recited in claim 1 wherein said second spring stores mechanical energy when contacted by said cam mounted on said shaft.

5. A butterfly valve assembly as recited in claim 1 wherein said first spring is a compression spring.

6. A butterfly valve assembly as recited in claim 5 wherein said second spring is a compression spring.

7. A butterfly valve assembly as recited in claim 1 wherein said second spring is a compression spring.

8. A butterfly valve assembly as recited in claim 1 wherein said butterfly valve is pivoted from its first position to its second position by hydraulic force.

* * * * *